US006789730B1

(12) United States Patent
Trelawney et al.

(10) Patent No.: US 6,789,730 B1
(45) Date of Patent: Sep. 14, 2004

(54) AUTOMATED BANKING MACHINE DIAGNOSTIC SYSTEM AND METHOD

(75) Inventors: George Neville Trelawney, Chennai (IN); Sharad Handoo, Delhi (IN); Sathiya Moorthy Paramasivam, Tamil Nadu (IN); Udhaya Kumar Varadarajan, Tamil Nadu (IN); Madhusudhanan Moorthy, Tamil Nadu (IN); Arjumand Ara, Tamil Nadu (IN); Suresh Ramamoorthy, Tamil Nadu (IN); Rajesh Kumar Vijayakumar, Tamil Nadu (IN); Siva Kumar Subramanian, Tamil Nadu (IN); Paul Mercina, North Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 0 days.

(21) Appl. No.: 10/417,869

(22) Filed: Apr. 17, 2003

Related U.S. Application Data

(60) Provisional application No. 60/401,410, filed on Aug. 5, 2002.

(51) Int. Cl.[7] .................................................. G06F 7/00

(52) U.S. Cl. ....................... 235/376; 235/379; 235/380; 902/8; 902/22; 902/37; 902/38; 902/39; 902/40

(58) Field of Search ................................ 235/376, 379, 235/383, 381; 902/8, 38, 39, 41; 705/64, 73

(56) References Cited

U.S. PATENT DOCUMENTS

| | | | | | |
|---|---|---|---|---|---|
| 5,983,197 | A | * | 11/1999 | Enta | 705/16 |
| 5,984,178 | A | * | 11/1999 | Gill et al. | 235/379 |
| 6,279,826 | B1 | * | 8/2001 | Gill et al. | 235/379 |
| 6,539,361 | B1 | * | 3/2003 | Richards et al. | 705/35 |
| 6,567,842 | B2 | * | 5/2003 | De Leo et al. | 709/200 |
| 6,676,018 | B1 | * | 1/2004 | Trelawney et al. | 235/381 |

FOREIGN PATENT DOCUMENTS

| | | | | |
|---|---|---|---|---|
| JP | 08249398 A | * | 9/1996 | G06F/19/00 |

* cited by examiner

*Primary Examiner*—Karl D. Frech
*Assistant Examiner*—Daniel Walsh
(74) *Attorney, Agent, or Firm*—Chrisropher L. Parmelee; Ralph E. Jocke; Walker & Jocke

(57) ABSTRACT

A diagnostic server software component for an automated banking machine is provided. The diagnostic server is operative to periodically retrieve diagnostic messages from a nonvolatile memory of the machine and store the diagnostic messages on the hard drive of the machine. The software is further operative responsive to communication from an external computing device to send diagnostic messages stored on the hard drive to an external computing device. The software may further be operative to route transaction diagnostic messages between the machine and a remote host banking system. The software may retrieve the diagnostic messages directly from a specified memory address of the nonvolatile memory. The software may periodically communicate with terminal control software of the machine to cause the terminal control software to retrieve the diagnostic messages from the nonvolatile memory.

20 Claims, 5 Drawing Sheets

AUTOMATED BANKING MACHINE DIAGNOSTIC SYSTEM AND METHOD

CROSS REFERENCE TO RELATED APPLICATIONS

This application claims benefit of U.S. Provisional Application Ser. No. 60/401,410 filed Aug. 5, 2002.

TECHNICAL FIELD

This invention relates to automated banking machines. Specifically this invention relates to an automated banking machine apparatus and system that is capable of producing diagnostic information related to the operation of the machine.

BACKGROUND ART

Automated banking machines are well known. A common type of automated banking machine used by consumers is an automated teller machine ("ATM"). ATMs enable customers to carry out banking transactions. Common banking transactions that may be carried out with ATMs include the dispensing of cash, the receipt of deposits, the transfer of funds between accounts, the payment of bills and account balance inquiries. The type of banking transactions a customer can carry out are determined by capabilities of the particular banking machine and the programming of the institution operating the machine. Other types of automated banking machines may allow customers to charge against accounts, to pay bills, to transfer funds or to cash checks. Other types of automated banking machines may print or dispense items of value such as coupons, tickets, wagering slips, vouchers, checks, food stamps, money orders, scrip or travelers checks. For purposes of this disclosure references to an ATM, an automated banking machine, automated transaction machine or an ATM shall encompass any device which carries out transactions including transfers of value.

ATMs generally capture errors and status messages associated with the operation of transaction function devices and other components of the ATM. Such error and status messages may for example indicate a date and time that a specific function of a specific device failed to operate properly. Such error and status messages may be recorded in a non-volatile data store which remains intact when the ATM is turned off. Such data stores may include a non-volatile RAM (NVRAM) of the ATM, or any other data store which can maintain a listing of error and status messages for extended periods of time.

ATMs may include data stores for storing error and status messages which are limited in the total amount of data that can be stored at any one time. As a result, the ATM's may be configured to only store the most recent error and status messages. When the data stores are completely filled with data, the older records related to the oldest error and status messages are deleted from the data store as new error and status messages are inserted into the data store.

Unfortunately, if a device produces only a few errors spread over a long period of time, a record of those errors may be deleted from the data store before the service technician has an opportunity to view the error messages for that device in the data store. Consequently, there exists a need for a system and method of retaining a larger number of error and status messages which are available for the service technician to view.

ATMs may include one or more output devices such as a display device. ATMs may also include terminal control software which is operative to provide user interfaces through the display device of the ATM. Such user interfaces may output viewable information to enable consumers to perform transactions and to enable service technicians to repair and service the ATM. ATMs may also include function keys, keypads, and other input devices which may be used to navigate through a user interface of the ATM. Such devices may not be as flexible as the input and output devices typically associated with a late model personal computer. For example, many ATMs often have display devices which are limited to producing user interfaces with character based displays or graphical displays which have low resolutions. Also, many ATMs do not include mice or full QWERTY style keyboards. Such limitations in the features of the input and output devices of an ATM may limit the productivity of service technicians when servicing and repairing an ATM. For example, the low resolution of an ATM display may only allow a limited number of error and status messages to be displayed at one time. The cumbersome use of a keypad to navigate through a user interface may increase the amount of time it takes to service and repair an ATM. Consequently there exists a need for a system and method of improving the productivity of a service technician with regard to accessing error and status messages of an ATM.

In addition although error messages may be collected within the NVRAM of some ATMs, the terminal control software of these ATMs may not be capable of displaying the details of the error messages at the ATM. When an ATM must be serviced, a service technician may not be able to easily identify the problems with the ATM without viewing the full details of the error messages stored in the NVRAM of the system. Thus, there further exists a need for a system of viewing error and status messages generated by the hardware of an ATM which may not be otherwise displayable at the ATM.

DISCLOSURE OF INVENTION

It is an object of an exemplary form of the present invention to provide a system and method for accessing information stored in an ATM.

It is a further object of an exemplary form of the present invention to provide a system and method for accessing diagnostic information stored in an ATM.

It is a further object of an exemplary form of the present invention to provide a system and method for accessing operational error and status messages stored in an ATM.

It is a further object of an exemplary form of the present invention to provide a system and method for retaining a larger number of error and status messages generated by an ATM.

It is a further object of an exemplary form of the present invention to provide a system and method for improving the productivity of a service technician with regard to accessing error and status messages of an ATM.

Further objects of exemplary forms of the present invention will be made apparent in the following Best Modes for Carrying Out Invention and the appended claims.

The foregoing objects may be accomplished in an exemplary embodiment by an automated banking machine that includes output devices such as a display screen and receipt printer. The machine may further include input devices such as a touch screen, keyboard, keypad, function keys, and card reader. The automated banking machine may further include transaction function devices such as a cash dispenser mechanism for sheets of currency, a depository mechanism and other transaction function devices which are used by the machine in carrying out banking transactions including transfers of value. In the exemplary embodiment the automated banking machine may include at least one computer. The computer may be in operative connection with the output devices and the input devices, as well as with the cash dispenser mechanism, depository mechanism and other physical transaction function devices in the banking machine. The computer may further be operative to communicate with a host system located remotely from the machine.

In the exemplary embodiment, the computer may include terminal control software components that are executable therein. The terminal control software components of the automated banking machine may be operative to cause the computer to output user interface screens through a display device of the machine. The user interface screens may include consumer screens which provide a consumer with information for performing consumer operations such as banking functions with the machine. The computer may operate responsive to the terminal control software components to control and communicate with hardware devices of the machine including the transaction function devices.

In one exemplary embodiment, a diagnostic server software component for an automated banking machine may be installed on the machine. The diagnostic server software component may be operative to periodically retrieve error and status messages and other diagnostic messages from a nonvolatile memory of the machine and store the messages on the hard drive of the machine. In one exemplary embodiment the diagnostic server software component may be operative to retrieve the diagnostic messages by periodically directing a computer of the machine to read a specific portion or range of memory addresses of the nonvolatile memory. In a further exemplary embodiment the diagnostic server software component may be operative to periodically send instructions to the terminal control software which prompt the terminal control software to retrieve diagnostic messages from the nonvolatile memory of the machine. Once the diagnostic messages have been retrieved from the nonvolatile memory, the diagnostic server software component may be operative to save the diagnostic messages in a data store located on a hard drive of the automated banking machine.

In exemplary embodiments, the diagnostic server software component may be operative to communicate with an external computing device through a communication port of the automated transaction machine. Such a communication port may include a network connection, a parallel port, a serial port, or other external port of the automated transaction machine that is operative to send and receive messages with an externally located computing device.

The exemplary embodiment of the diagnostic server software component may operate responsive to messages received from the external computing device to send all or portions of the diagnostic messages stored on the hard drive to the external computing device. In addition in alternative exemplary embodiments, the diagnostic server software component may be operative to initiate the transfer of one or more diagnostic messages stored on the hard drive to an address associated with the external computing device.

The exemplary diagnostic server software may further be operative to route transaction messages between the terminal control software of the machine and a remote host system. For example in an automated banking machine configured to communicate with a host system through a TCP/IP network, the terminal control software may be configured to send messages for the host to a TCP/IP address and port associated with the diagnostic server software component. The diagnostic server software component may then be configured to forward the messages received from the transaction software of the machine to a TCP/IP address and port associated with the host system. Likewise, the diagnostic server software component may be configured to receive messages sent from the host system to the automated banking machine. The diagnostic server software component may then forward the messages received from the host system to a TCP/IP address and port associated with the terminal control software.

In this described exemplary embodiment, the diagnostic server software may retrieve diagnostic messages by sending to the TCP/IP address and port associated with the terminal control software, a message representative of a command to return diagnostic messages to the host system. When the terminal control software subsequently sends the diagnostic message to the host system, the exemplary diagnostic server software may be operative to intercept the message and store the diagnostic messages in a data store on the hard drive of the machine. The diagnostic server software application may further be operative to not route the diagnostic messages to the address of the host system.

In further exemplary embodiments, the diagnostic server software component may be operative responsive to communications from the external computing device to delete all or portions of the diagnostic messages stored on the hard drive of the machine. The diagnostic server software component may further be operative responsive to communications from the external computing device to change a parameter associated with the duration period at which the diagnostic server software periodically retrieves diagnostic messages from the nonvolatile RAM of the machine.

The diagnostic server software component may further be operative responsive to communications from the external computing device to change communication parameters associated with the network addresses and ports used to communicate with the terminal control software, the host system, and external computing devices.

BEST MODES FOR CARRYING OUT INVENTION

Figure 1:
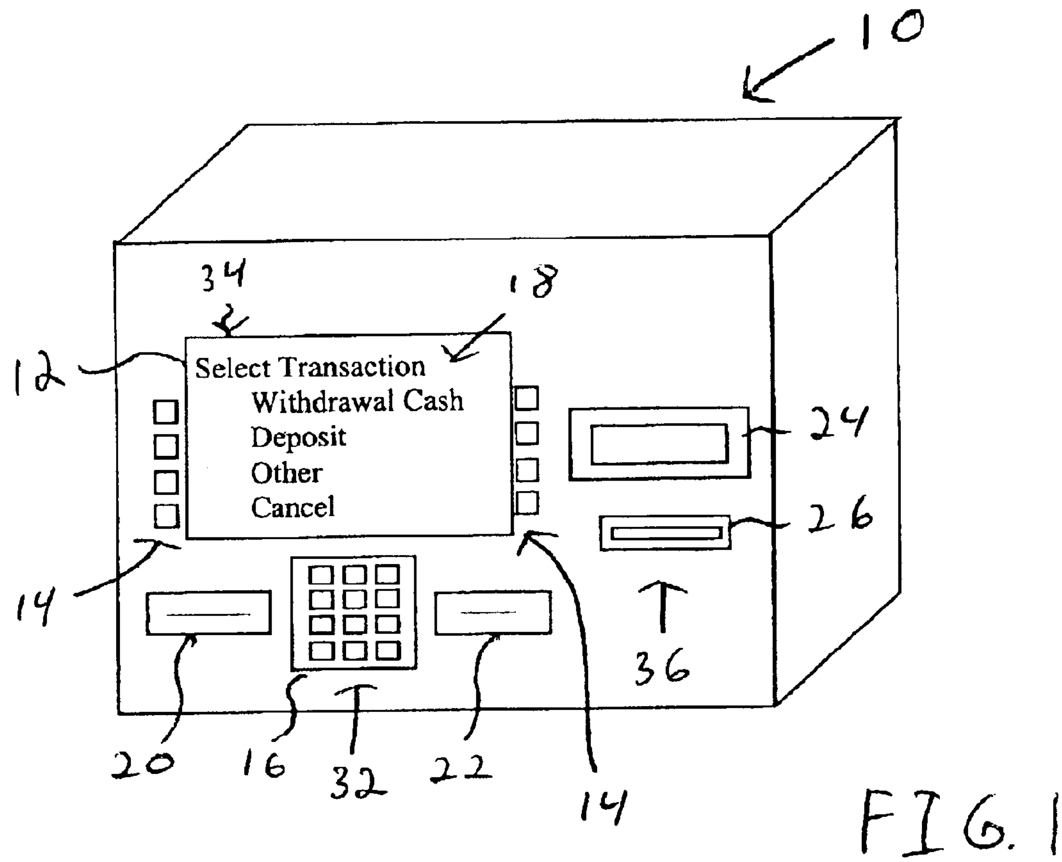
FIG. 1 is a perspective view representative of an exemplary embodiment of an automated banking machine.

Referring now to the drawings and particularly to FIG. 1, there is shown therein a perspective view of an automated banking machine 10 which in this described exemplary embodiment corresponds to an ATM. Here the automated banking machine or ATM 10 may include at least one output device 34 such as a display device 12. The display device 12 may be operative to provide a consumer with a user interface 18 that may include a plurality of screens or other outputs including selectable options for operating the machine. The exemplary embodiment may further include other types of output devices such as a receipt printer 20, speakers, or any other type of device that is capable of outputting visual, audible, or other sensory perceptible information.

The exemplary embodiment of the automated banking machine 10 may include a plurality of input devices 32 such as a keypad 16 and function keys 14 as well as a card reader 22. The exemplary embodiment of the machine 10 may further include or use other types of input devices, such as a touch screen, microphone, or any other device that is operative to provide the machine with inputs representative of user instructions or information. The machine may also include one or more biometric input devices such as a fingerprint scanner, an iris scanner, facial recognition device, hand scanner, or any other biometric reading device which may be used to read a biometric input that can be used to identify a user.

The exemplary embodiment of the automated banking machine 10 may further include a plurality of transaction function devices which may include for example a cash dispenser 24, a depository mechanism 26, a cash recycler mechanism, or any other type of device which is operative to perform transaction functions involving transfers of value.

Figure 2:
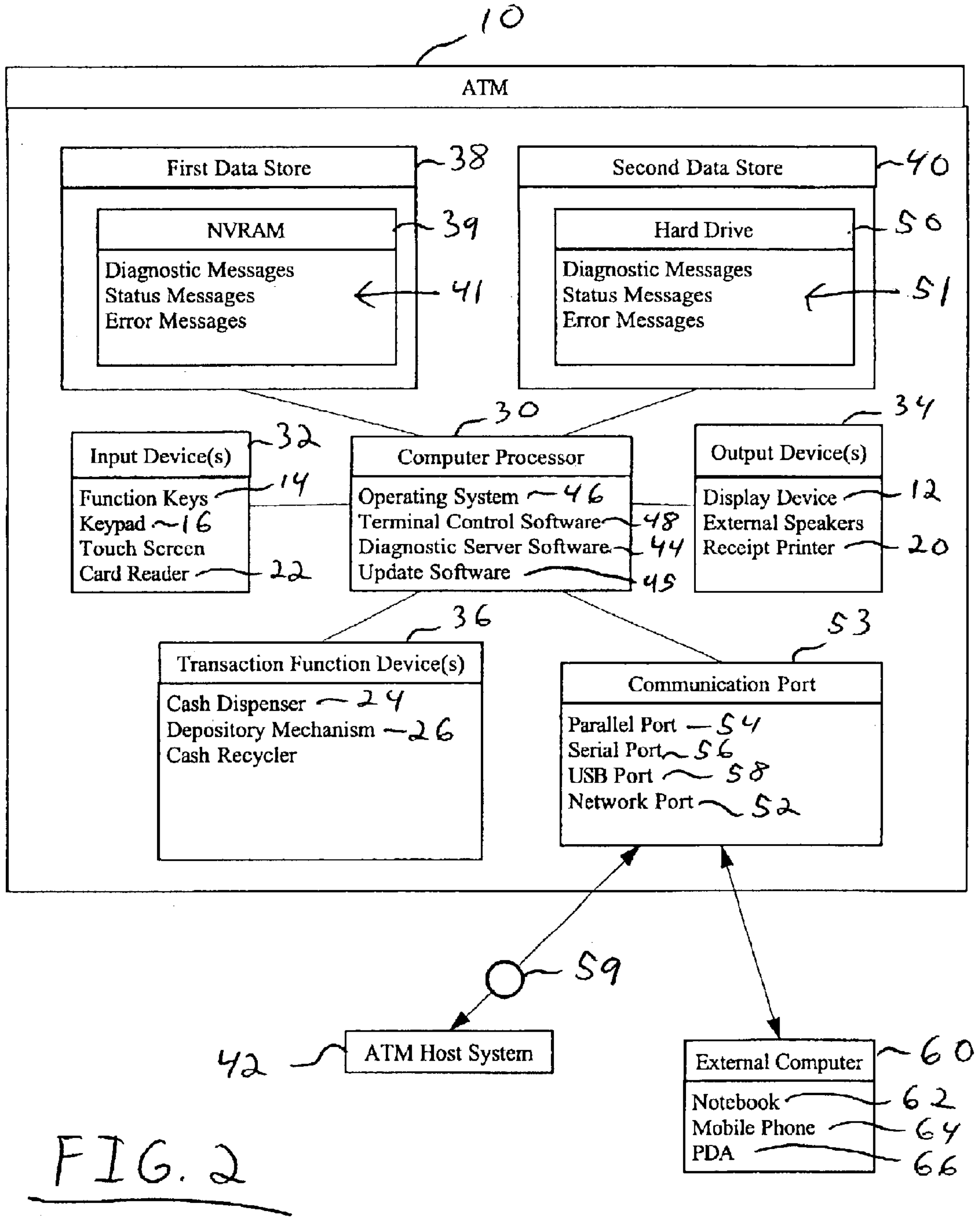
FIG. 2 is a schematic view of the exemplary embodiment of an automated banking machine.

FIG. 2 shows a schematic view of components which may be included in the ATM 10. The machine 10 may include at least one computer 30. The computer 30 may be in operative connection with the input device(s) 32, the output device(s) 34, the transaction function device(s) 36, and at least one first data store 38. The first data store 38 may be operative to store messages 41 associated with the operation of transaction function devices, input devices, output devices, other hardware devices and/or software components of the ATM. Such messages 41 may include for example status messages, error messages or any other message which may provide diagnostic information useful for servicing and maintaining the ATM. As used herein all such messages will be referred to herein as diagnostic messages.

In one exemplary embodiment the data store 38 may include a nonvolatile memory such as a NVRAM 39. Diagnostic messages 41 associated with operation of the ATM and the devices of the ATM may automatically be stored by the ATM in the NVRAM. When electrical power is removed from the ATM, the exemplary embodiment of the NVRAM may be operative to retain any diagnostic messages stored therein. As a result when the power to the ATM is restored the diagnostic messages remain intact within the NVRAM.

The exemplary embodiment may further include at least one terminal control software component 48 operative in the computer 30 as well as an operating system 46. The terminal control software components 48 may be operative to control the operation of the machine by both a consumer and an authorized user such as a service technician. For example such terminal control software components may include applications which enable a consumer to dispense cash, deposit a check, or perform other transaction functions with the machine. In addition the terminal control software components may include applications which enable a service technician to perform configuration and maintenance functions with the machine.

Exemplary embodiments of the automated banking machine 10 may be operative to communicate with a transaction processing server which is referred to herein as an ATM host banking system 42. Such an ATM host banking system 42 may be operative to authorize the automated banking machine 10 to perform transaction functions for users such as withdrawing cash from an account through operation of the cash dispenser 24, depositing checks or other items with the depository mechanism 26, performing a balance inquiry for a financial account and transferring value between accounts.

In an exemplary embodiment, the terminal control software 48 may be operative to access or retrieve diagnostic messages stored in the NVRAM 39 responsive to a communication such as a command message received by the terminal control software. Such a command message may be received from the host banking system 42 in operative connection with the ATM. In response to receiving the command message, the terminal control software may be operative to read the diagnostic messages stored in the NVRAM of the ATM and send a copy of the diagnostic messages to an address associated with the host banking system.

An exemplary embodiment of the ATM 10 may include one or more types of communication ports 53. Such communication ports may include one or more network ports 52, parallel ports 54, serial ports 56, and/or USB ports 58. In the exemplary embodiment the network ports 52 may be connected to a public or private network 59 which includes the ATM host banking system 42. The terminal control software 48 may be operative to communicate with the host system through one of the network ports 52. In an exemplary embodiment, the address of the host banking system such as a TCP/IP IP address and port number may be configurable parameters of the ATM.

In an exemplary embodiment, the ATM 10 may also be operative to communicate with an external computer 60 through one of the communication ports 53. Such an external computer may include for example a notebook computer 62, mobile phone 64, PDA 66, or other types of computing devices which are adapted to connect to the ATM through one of the communication ports 53. For example, an external computer may include a network port which may be connected to the network port 52 of the ATM 10 using a network patch cable. In other exemplary embodiments, the external computer may include a parallel port which may be connected to the parallel port 54 of the ATM 10 using a parallel cable such as a Laplink® communication cable.

The exemplary embodiment of the ATM 10 may further include a diagnostic server software component 44 operative in the computer 30. The diagnostic server may be operative to communicate with the external computer 60 through the communication port 53 of the ATM 10. The diagnostic server 44 may correspond to a software program, service, or daemon which is loaded into the memory of the ATM and runs in the background while the terminal control software components of the ATM also execute in the computer. In this described exemplary embodiment, the diagnostic server 44 may be initially loaded by the operating system when the ATM is initially started or restarted. As will be explained in further detail below, the diagnostic server software may be responsive to communications received from the external computer 60 to retrieve and return to the external computer, the diagnostic messages 41 related to the operation of the ATM.

The exemplary embodiment of the ATM 10 may further include an update software component 45 operative in the computer 30. As will be explained in more detail below, the update software component 45 may be operative to update, modify, or delete the diagnostic server software on the ATM responsive to files detected on a floppy disk, CD-ROM or other portable medium inserted into a portable medium drive of the ATM.

The ATM may also include or be in operative connection with at least one second data store 40. The diagnostic server 44 may be operative to access the diagnostic messages 41 stored in the NVRAM 39 and may be operative to store corresponding copies of the diagnostic messages 51 in the second data store 40 of the ATM. The second data store 40 may for example include at least one data file or database which is stored on a hard drive 50 of the ATM 10.

Figure 3:
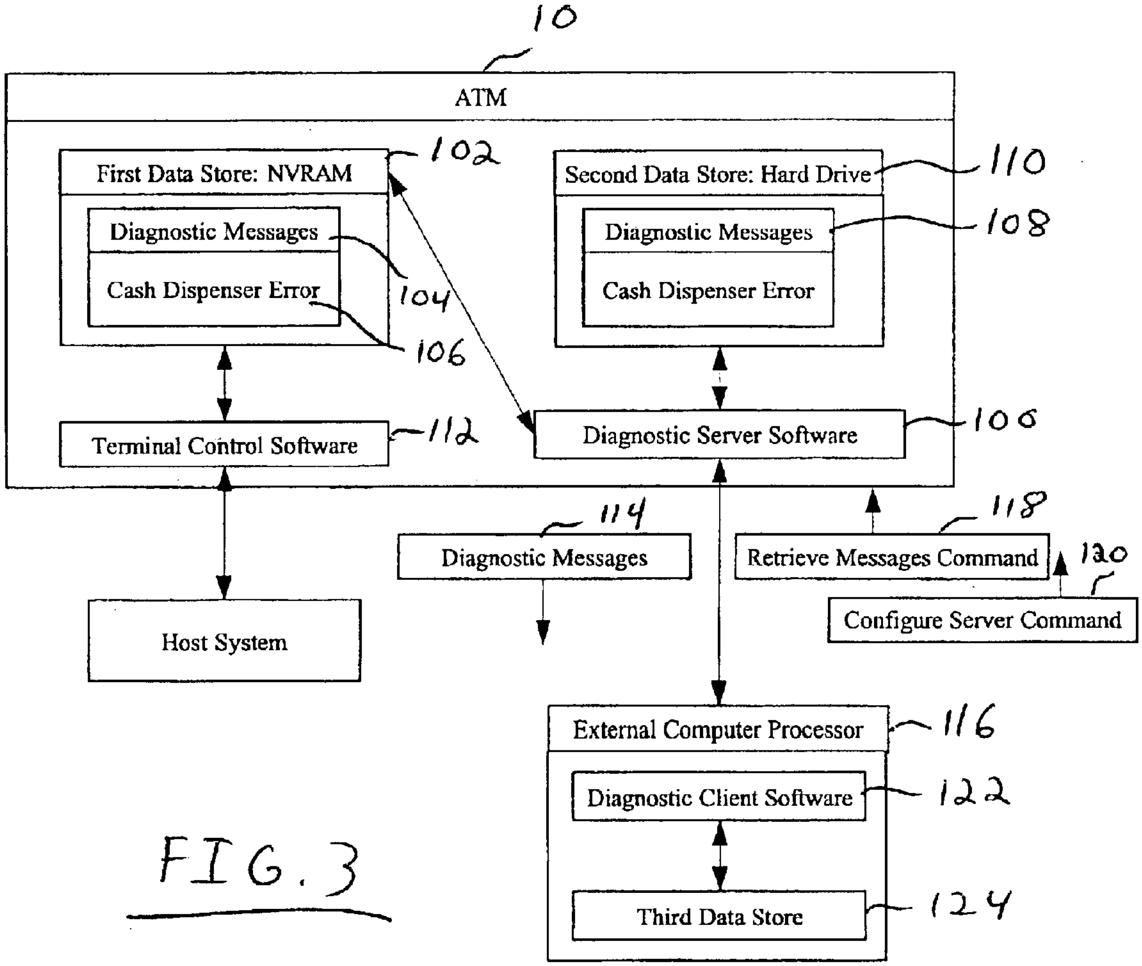
FIG. 3 is a schematic view of the operation of an exemplary embodiment of a diagnostic server software component.

FIG. 3 shows a schematic view of an exemplary embodiment of the operation of a diagnostic server 100 within the ATM 10. Here a first data store 102 such as an NVRAM of the ATM may include a plurality of diagnostic messages 104. Such messages may be placed in the NVRAM by the terminal control software 112 of the ATM. In alternative exemplary embodiments the diagnostic messages 104 may be placed in the NVRAM by another component of the ATM such as a communication sub-system and/or by the hardware devices of the ATM themselves.

At least one of the diagnostic messages 104 may correspond to a status or error message 106 associated with one of the transaction function devices such as a cash dispenser of the ATM. In this described exemplary embodiment, the diagnostic server 100 may be operative to periodically cause the computer of the ATM to store a second plurality of diagnostic messages 108 in a second data store 110 which correspond to at least one portion of the first plurality of diagnostic messages 104 stored in the first data store 102. In an exemplary embodiment exact copies of the diagnostic messages 104 in the NVRAM may be copied to the second data store 110 without modification. In other exemplary embodiments, the diagnostic server software may convert the first plurality of diagnostic messages 104 to a different format prior to storing them in the second data store 110 as the second plurality of diagnostic messages 108. As used herein the term copy may correspond to either an exact copy of messages from one data store to another or may correspond to the generation of messages in another data store which generally correspond to the original messages. In the latter type of copy, the new messages may be in a different format with less or more data when compared to the original messages.

In addition, in an exemplary embodiment, the diagnostic server component 100 may be operative to determine whether one or more of the first plurality of diagnostic messages 104 have been previously copied to the second data store 110. To prevent duplicate messages from accumulating in the second data store 110, those diagnostic messages which have not been previously copied to the second data store may then be copied to the second data store, while those diagnostic message which have been previously copied may not be copied to the second data store.

In an exemplary embodiment, the second data store 110 may correspond to one or more data files stored on a hard drive which are modified by the diagnostic server to include copies of new diagnostic messages retrieved from the first data store 104. In other exemplary embodiments the second data store may correspond to a local database server running on the ATM which is operative to maintain at least one table of records which correspond to the second plurality of diagnostic messages 108. In other exemplary embodiments, the second data store 110 may correspond to at least one directory or folder on the hard drive of the ATM. The second plurality of diagnostic messages 108 may correspond to individual files (one for each message) which are stored in the directory or folder on the hard drive.

In the exemplary embodiment, the second data store 100 may be operative to store a larger number of messages than the first data store 102. When the first data store is filled with diagnostic messages, any new messages stored in the first data store may result in the oldest of the diagnostic messages being deleted from the first data store. To enable the second data store to have at least one corresponding copy of each diagnostic message that may at one point be stored in the first data store 102, the diagnostic server 100 may be configured to periodically copy new diagnostic messages from the first data store 102 to the second data store 110 responsive to a specified time duration parameter. When such a time duration parameter for example corresponds to five minutes, every five minutes the diagnostic server 100 may be operative to copy new diagnostic messages present in the first data store 102 to the second data store 110.

In an exemplary embodiment, the diagnostic server may be operative to cause the computer of the ATM 10 to send a third plurality of diagnostic messages 114 to an external computer 116 responsive to at least one communication 118 received from the external computer 116 which is representative of a command to retrieve diagnostic messages. In this described exemplary embodiment the third plurality of diagnostic messages 114 may correspond to all or at least a portion of the second plurality of diagnostic messages 108 stored in the second data store 110. For example, the communication 118 may cause all of the diagnostic messages 108 stored in the second data store to be transferred to the external computer 116. In other exemplary embodiments, the communication 118 may specify a subset of diagnostic messages 108 stored in the second data store to be transferred to the external computer 116. Such subsets for example may correspond to diagnostic messages generated on a specific date or date range. Such subsets may also correspond to messages for different types of diagnostic messages and different types of devices.

In the exemplary embodiment, the time duration parameter may be a modifiable parameter stored on the ATM. In addition the diagnostic server may include other modifiable parameters such as a maximum storage size of the second data store 110. In the exemplary embodiment, the diagnostic server may be operative to prevent the second data store 110 from increasing in size beyond the maximum storage size parameter. When the data store has reached the specified maximum storage size, the diagnostic server component may be operative to delete the oldest diagnostic messages stored in the second data store when new diagnostic messages are added to prevent the second data store from expanding beyond the specified maximum storage size.

An exemplary embodiment of the diagnostic server 100 may be operative to change the time duration parameter, maximum storage size parameter or other parameters responsive to at least one further communication 120 from the external computer 116. The further communication 120 for example may include a command which specifies which parameter of the diagnostic server to change and what value to change it to. The further communication 120 may also specify that the diagnostic server perform operations on the diagnostic messages of the data store, such as deleting one or more of the diagnostic messages in the second data store 110. The further communication 120 may also specify that the diagnostic server immediately perform a copy of diagnostic messages found in the first data 102 to the second data store 11.

In an exemplary embodiment of the present invention, the diagnostic server 100 may be operative to communicate with the external computer 160 through a parallel port or serial port of the computer of the ATM 10. In alternative exemplary embodiments, the diagnostic server 100 may be operative to communicate with the external computer 116 through a network port of the ATM. In exemplary embodiments, where the network port is also used to connect to a host banking system, the cable connecting the host banking system network to the ATM may be disconnected from the network port of the ATM and the network cable from the external computer may be connected to the network port of the ATM.

In the exemplary embodiment, the external computer 116 may include a diagnostic client software component 122 which is operative to send communications 118, 120 to the ATM through the communication port of the ATM. The diagnostic client 122 may be operative to receive the third plurality of diagnostic messages 114 from the ATM. Such messages may be stored by the diagnostic client software component in a third data store 124. The diagnostic client component may provide an interactive user interface through a display device of the external computer which enables a user to display, sort, filter and otherwise manipulate the diagnostic messages stored in the third data store 124. The diagnostic client software component may further include a plurality of command buttons, menus or other selectable user interface elements which enable a user to cause the diagnostic client software components to send the previously described communications 118, 120 to the ATM.

In an exemplary embodiment, the diagnostic server may include a memory address which specifies the portion of memory of the computer of the ATM which corresponds to the first data store. In addition, the diagnostic server may be configured in the computer such that it has sufficient privileges to access the first data store. For example, on an ATM with an IBM OS2 WARP® operating system, the diagnostic server software component may be installed as a driver which runs in a ring of the operating system which may access specific memory locations of the computer of the ATM which correspond to the first data store. In other exemplary operating systems such as Microsoft Windows 2000/XP or Linux, the diagnostic server may correspond to a service or daemon which has sufficient access privileges or rights to access memory corresponding to the location of the first data store.

In this described exemplary embodiment, the diagnostic server may cause the computer to retrieve a block of data from the specific memory address which corresponds to the first data store. The diagnostic server software may then cause the computer to store any diagnostic messages included in the block of data in the second data store.

The exemplary embodiment may further include a method of modifying a preexisting ATM to include the previously described diagnostic server software component. Preexisting models of ATMs may have a first data store that corresponds to an NVRAM. An example of such an ATM may include an NCR 5875 model ATM running NDC+ terminal control software. The NDC+ terminal control software may be programmed to know the memory location of the diagnostic messages stored in the NVRAM. The NDC+ terminal control software may further be able to retrieve diagnostic messages stored in the NVRAM for its own use. However the NDC+ terminal control software may not have the capability of communicating diagnostic messages to an external computing device connected to a parallel port of the ATM. Thus to enable a preexisting ATM to have such features, the previously described diagnostic server component software may be installed on the ATM.

To prevent unauthorized users from installing malicious software on the computer of the ATM, many ATMs may include built-in security features which prevent even an authorized user from installing third party software on the hardware of an ATM. For example an NCR 5875 may include a BIOS or other hardware which limits the ATM to booting from only an NDC+ setup floppy disk and not a third party boot floppy disk. When the ATM has booted, the NDC+ configuration software may not include features which enable third party software to be installed on the ATM.

To enable such an ATM to be updated with new features such as the previously described diagnostic server, an exemplary method of installing the software on the ATM, may include disconnecting the hard drive of the ATM from the computer of the ATM. The installing method may further include connecting the hard drive of the ATM to a external computer such as a notebook or other computer that includes a hard drive interface which is compatible with the hard drive from the ATM. Once the hard drive of the ATM is connected to an external computer, the external computer may include an installation program that is operative to copy the files that correspond to the diagnostic server software to an appropriate location on the hard drive of the ATM. The installation program may also be operative to modify preexisting configuration files on the hard drive of the ATM, so as to enable the diagnostic server to automatically start as a background service or driver when the ATM is booted.

Once the diagnostic server has been properly setup on the hard drive of the ATM, the hard drive may be disconnected from the external computer and reconnected with the computer of the ATM. When the ATM is started, the operating system of the ATM may be operative responsive to the modified configuration files on the hard drive of the ATM to load the diagnostic server software. As previously described such software may periodically copy diagnostic messages stored in the NVRAM of the ATM to a data store on the hard drive of the ATM. For an NCR model ATM, the diagnostic messages may be stored within a 32 k block of memory in the NVRAM. The diagnostic server may retrieve the 32 k block of memory and store diagnostic messages present in the 32 k block of memory in the data store on the hard drive. In exemplary embodiments, the diagnostic server may further be operative to only copy diagnostic messages from the 32 k block which are new and have not already been copied to the data store on the hard drive. In the exemplary embodiment, the data store on the hard drive may be operative to store many megabytes of diagnostic messages depending on the amount of free space available on the hard drive.

To retrieve the diagnostic messages from the hard drive, an external computer may be connected to the parallel port or other communication port of the ATM. The diagnostic server may be operative to detect when an external computer is connected to the parallel port and be operative to respond to communications received through the parallel port. When such communications are representative of a command to retrieve diagnostic messages, the diagnostic server may read the diagnostic messages stored on the hard drive and send the diagnostic messages in a communication through the parallel port interface to the external computer.

An exemplary embodiment of the diagnostic server may further be operative to enable the software to be updated without requiring the hard drive to be removed. The diagnostic server may include or be installed on the hard drive of the ATM along with an update software component. The update software component may be operative to monitor the floppy disk drive of the computer for the presence of a floppy disk with an update file. When the floppy disk includes the update file, the diagnostic server software may be operative to install the update file on the hard drive of the ATM. In other exemplary embodiments, the update software may be operative to monitor other portable storage medium drives of the ATM such as a CD drive.

In an exemplary embodiment, the update file may be digitally signed and the diagnostic server software may be operative to verify the signature prior to installing the update on the hard drive. In an exemplary embodiment the diagnostic server software may be operative to check the floppy disk drive or other storage device drive for the presence of an update file each time the diagnostic server software is started which may correspond to when the ATM is started or restarted. Alternative exemplary embodiments of the update software may be operative to monitor the floppy disk drive or other portable storage medium drive for an update file at other times. The update software may also check for an update file responsive to a communication received from an external computer. Thus to update the diagnostic server software, an update file on a floppy disk may be inserted into the floppy disk drive of the ATM. The ATM may then be rebooted. When the operating system of the ATM starts the update software, the software may check for a floppy disk in the floppy disk drive of the ATM which includes an update file. The update file may then automatically cause the ATM to update the diagnostic server program files on the ATM responsive to the update file.

In an exemplary embodiment, to enable the removal of the diagnostic server software without removing the hard drive, the update software may be operative to automatically uninstall diagnostic server software responsive to an uninstall file located on the floppy disk. In addition the update software may be responsive to an install file located on the floppy disk to reinstall the diagnostic server software on the hard drive of the ATM. In addition to updating, installing, and uninstalling the diagnostic server software, the update software may further be operative to update, install, and uninstall other third party software on the hard drive of the ATM responsive to a update file on a floppy disk or other portable storage medium. In further embodiments, the update software and/or the diagnostic server software may be operative responsive to communications from the external computer 116 to access a floppy disk or other portable storage medium for purposes of modifying, updating, deleting, and configuring software on the hard drive of the ATM. In further exemplary embodiments, the update software and/or diagnostic software may be operative to receive updated software from the external computer 116 directly.

In exemplary embodiments, the update software and/or diagnostic software may be operative to validate that the communications received from the external computer 116 are from an authorized source. For example in an exemplary embodiment the update software and/or diagnostic software may require the client computer to submit a password which is validated by the update software and/or diagnostic software prior to acting on the communications from the client computer. In other exemplary embodiments, the communications may be digitally signed and the update software and/or diagnostic software may be operative to authenticate the digital signatures associated with the communications from the external computer 116.

In the previously described example the diagnostic server software may be operative to cause the computer of the ATM to directly access a specific memory address of the NVRAM which includes the diagnostic messages. In a further exemplary embodiment, the diagnostic server software may be operative to acquire the diagnostic messages by communicating with the terminal control software of the ATM.

Figure 4:
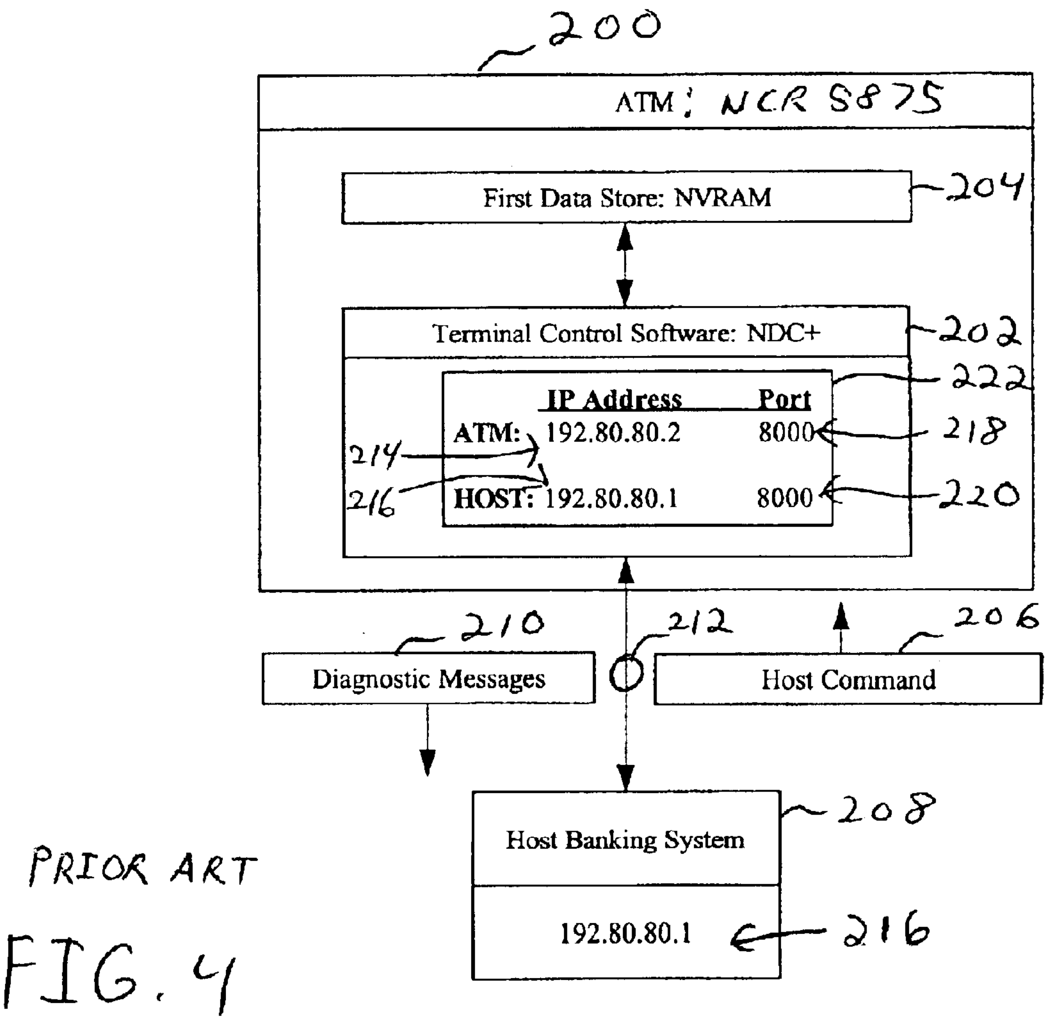
PRIOR ART FIG. 4
FIG. 4 is a schematic view of a prior art ATM.

FIG. 4 shows an exemplary embodiment of a prior art ATM 200 which is in operative connection with a host banking system 208 through a network 212. Here the ATM 200 includes terminal control software 202 which is operative to retrieve diagnostic messages from an NVRAM 204 of the ATM responsive to a host command message 206 from the host banking system 208. The ATM 200 may then send the retrieved diagnostic messages 210 to the host banking system 208. In this example, the network 212 may correspond to a TCP/IP network with the ATM 200 having a first IP address 214 and the host banking system 208 having a second IP address 216. The terminal control software 202 may be configured to receive messages from the host system which are associated with a specific TCP/IP port 218. The terminal control software 202 may also be configured to send messages to the TCP/IP address of the host banking system which are also associated with a specific TCP/IP port 220.

The IP address and port of the host banking system and the IP address and port of the terminal control software may be configurable parameters 222 of the ATM which may be modified using one or more configuration screens included with the terminal control software 202. For example, when the ATM is first installed or is installed in a new location on a different network, the ATM may be assigned a new or different IP address and port. In addition the ATM may be configured to communicate with a new or different host banking system which is associated with a new or different IP address and port. To configure the ATM to function correctly on the new network, an authorized user may access a configuration screen of the terminal control software 202 which enables the user to modify the network configuration parameters 222 of the ATM.

Figure 5:
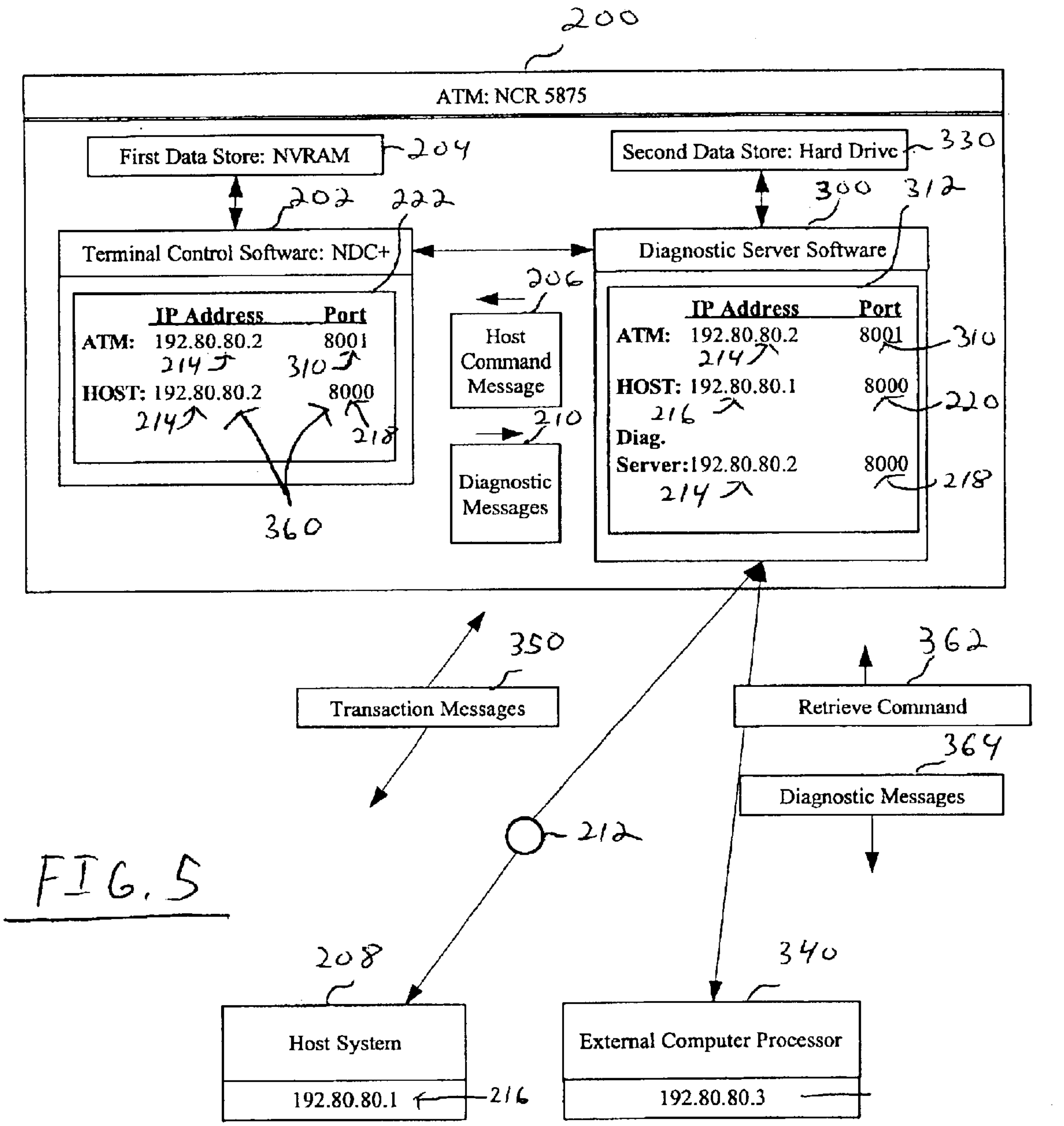
FIG. 5 is a schematic view of an ATM that is modified to include a diagnostic server software component.

FIG. 5 shows the ATM 200 after an alternative exemplary embodiment of the diagnostic server 300 has been installed on the ATM 200. Here the diagnostic server software 300 may be operative to act as a gateway or router between the terminal control software 202 and the host banking system 208. To configure the ATM to send transaction messages and other communications through the diagnostic server, the configuration parameters 222 of the terminal control software 202 of the ATM may be modified so that the host IP address and port parameters 360 correspond to the IP address 214 and port 218 associated with the diagnostic server 300 rather than the actual IP address 216 and port 220 of the host banking system 208.

Because the diagnostic server and terminal control software are on the same machine the IP address for the host banking system in the configuration parameters 222 of the terminal control software may be the IP address 214 assigned to the ATM. The diagnostic server may include configuration parameters 312 through which the diagnostic server may be configured to receive messages from the host banking system at the IP address 214 of the ATM and at the specific port 218, which the host banking system is configured to send messages to the ATM. To prevent the terminal control software 202 from receiving messages directly from the host system, the configuration parameters 222 of the terminal control software may be modified to change the port where the terminal control software listens for messages to a new port 310 which is different than the port 218 associated with the diagnostic server.

To be operable as a router, the configuration parameters 312 of the diagnostic server may be configured with the IP address 214 and port 310 associated with the terminal control software and the IP address 216 and port 220 associated with the host banking system. With the terminal control software and the diagnostic server software configured in this manner, the diagnostic server may be operative to receive messages including transaction messages from the terminal control software and route them to the host banking system. Likewise the diagnostic server may be operative to receive messages including transaction messages from the host banking system and route them to the terminal control software. The transaction messages 350 being routed between the terminal control software 202 and the host banking system 208 may for example correspond to transaction functions such as the dispense of cash which is performed by the ATM and is authorized by the host banking system.

The exemplary embodiment of the diagnostic server 300 may further be operative to periodically send a host command message 206 to the terminal control software 202 which requests the terminal control software to return to the host banking system copies of the diagnostic messages stored in the NVRAM 204. In response to receiving the host command message 206, the terminal control software may send the diagnostic messages 210 to the diagnostic server. When diagnostic messages 210 are received from the terminal control software, the diagnostic server may be operative to store the diagnostic messages 210 in the second data store 330 as previously described and suppress the routing of the diagnostic messages 210 to the host banking system.

The diagnostic server 300 may also be responsive to communications 362 received from an external computer 340 to send diagnostic messages 364 stored in the second data store 330 to the external computer. As discussed previously, the diagnostic server 300 may be operative to communicate with the external server through a communication port of the ATM such as a parallel port or network port. When the network port is used to connect the ATM to the network 212 of the host banking system, the ATM may be taken out of service and the network cable to the network 212 may be disconnected. A network cable from the external computer 340 may then be connected to the network port of the ATM so that the external computer 340 may communicate with the diagnostic server. In this described embodiment, the diagnostic server and the external computer may also use the TCP/IP protocol or any other protocol which the ATM 200 is capable of using to communicate with each other.

Computer software instructions used in operating the automated banking machines and connected computers may be loaded from computer readable media or articles of various types into the respective computers. Such computer software may be included on and loaded from one or more articles such as diskettes or compact disks. Such software may also be included on articles such as hard disk drives, tapes or read-only memory devices. Other articles which include data representative of the instructions for operating computers in the manner described herein are suitable for use in achieving operation of automated banking machines and systems in accordance with exemplary embodiments.

The exemplary embodiments of the automated banking machines and systems described herein have been described with reference to particular software components and features. Other embodiments of the invention may include other or different software components which provide similar functionality.

Thus, the new automated banking machine diagnostic system and method achieves one or more of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof. The description of the exemplary embodiment included in the Abstract included herewith shall not be deemed to limit the invention to features described therein.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. An automated transaction machine system comprising:

at least one first computer, wherein the at least one first computer includes a memory device and a hard drive;

a first data store in the memory device of the at least one first computer;

a second data store in the hard drive of the at least one first computer;

at least one transaction function device in operative connection with the at least one first computer, wherein the at least one of the transaction function device includes a cash dispenser, wherein the at least one first computer is operative to cause a first plurality of diagnostic messages associated with operation of the machine to be stored in the first data store, wherein at least one of the first plurality of diagnostic message includes a cash dispenser error;

at least one first software component operative in the at least one first computer, wherein the at least one first software component is operative to periodically cause the at least one first computer to store a second plurality of diagnostic messages in the second data store that correspond to at least one portion of the first plurality of diagnostic messages stored in the first data store, wherein the at least one first software component is operative to cause the at least one first computer to send a third plurality of diagnostic messages to at least one second computer responsive to a first communication received from the at least one second computer, wherein the third plurality of diagnostic messages correspond to at least a portion of the second plurality of diagnostic messages stored in the second data store.

2. The system according to claim 1, wherein the at least one first software component includes a time duration parameter, wherein the at least one first software component is operative to periodically cause the at least one first computer to copy the at least one portion of the first plurality of diagnostic messages stored in the first data store to the second data store responsive to the time duration parameter.

3. The system according to claim 2, wherein the at least one first software component is operative to cause the at least one first computer to modify the time duration parameter responsive to a second communication from the at least one second computer.

4. The system according to claim 1, wherein the at least one first software component is operative to cause the at least one first computer to not store that portion of the first plurality of diagnostic messages in the second data store which has been previously stored in the second data store.

5. The system according to claim 1, wherein when the first plurality of diagnostic messages includes a first portion which has not been copied to the second data store and a second portion which has been copied to the second data store, the at least one first software component is operative to cause the at least one first computer to copy to the second data store the first portion and not the second portion.

6. The system according to claim 1, wherein the at least one first software component is operative to cause the at least one first computer to copy the at least one portion of the first plurality of diagnostic messages stored in the first data store to the second data store responsive to a second communication received from the at least one second computer.

7. The system according to claim 1, wherein the at least one first software component is operative to cause the at least one first computer to delete at least one portion of the second plurality of diagnostic messages stored in the second data store responsive to a second communication received from the at least one second computer.

8. The system according to claim 1, wherein the memory device includes a nonvolatile RAM.

9. The system according to claim 1, wherein the first plurality of diagnostic messages includes error messages associated with the operation of the machine.

10. The system according to claim 1, wherein the first plurality of diagnostic messages includes status messages associated with the operation of the machine.

11. The system according to claim 1, further comprising a terminal control software component operative in the computer, wherein the terminal control software component is operative to cause the at least one first computer possessor to operate the cash dispenser.

12. The system according to claim 11, wherein the at least one first software component is operative to cause the at least one first computer to route a plurality of transaction messages between the terminal control software and a host system located remotely from the machine.

13. The system according to claim 12, wherein the plurality of transaction messages includes at least one transaction message associated with a dispense of cash from the cash dispenser.

14. The system according to claim 13, wherein the terminal control software is operative responsive to the at least one first software component to cause the at least one first computer to retrieve the at least one portion of the first plurality of diagnostic messages from the first data store and send the retrieved diagnostic messages to the first software component.

15. The system according to claim 14, wherein the at least one first software component is operative to cause the at least one first computer to store the retrieved diagnostic messages in the second data store.

16. The system according to claim 15, wherein the at least one first software component is operative to communicate with the terminal control software through at least one first TCP/IP port.

17. The system according to claim 16, wherein the at least one first software component is operative to communicate with the remote host system through at least one second TCP/IP port.

18. The system according to claim 1, wherein the at least one first software component is operative to cause the at least one first computer to access the first plurality of diagnostic messages from a range of memory addresses of the memory device, wherein the at least one first software component is operative to determine the memory addresses of the first plurality of diagnostic messages in the memory device responsive to a memory address parameter stored in the at least one first software component.

19. The system according to claim 1, further comprising a parallel port in operative connection with the at least one first computer, wherein the at least one first software component is operative to cause the first computer to communicate with the second computer through the parallel port.

20. The system according to claim 1, wherein the second data store is operative to store larger of diagnostic messages than the first data store.

* * * * *